(12) United States Patent
Mizuno

(10) Patent No.: US 9,628,865 B2
(45) Date of Patent: Apr. 18, 2017

(54) ENHANCED CLOSED CAPTION FEATURE

(71) Applicant: Apple Inc., Cupertino, CA (US)

(72) Inventor: Takayuki Mizuno, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/657,423

(22) Filed: Oct. 22, 2012

(65) Prior Publication Data

US 2014/0071343 A1   Mar. 13, 2014

Related U.S. Application Data

(60) Provisional application No. 61/699,196, filed on Sep. 10, 2012.

(51) Int. Cl.
*H04N 7/00* (2011.01)
*H04N 21/488* (2011.01)
*H04N 21/431* (2011.01)

(52) U.S. Cl.
CPC ..... *H04N 21/4884* (2013.01); *H04N 21/4314* (2013.01)

(58) Field of Classification Search
USPC ................. 348/465, 468, 581, 569
See application file for complete search history.

(56) References Cited

U.S. PATENT DOCUMENTS

| | | | | |
|---|---|---|---|---|
| 5,396,297 A | * | 3/1995 | Shindou et al. | 348/569 |
| 5,477,274 A | * | 12/1995 | Akiyoshi et al. | 348/468 |
| 5,805,153 A | * | 9/1998 | Nielsen | 725/37 |
| 5,943,049 A | * | 8/1999 | Matsubara et al. | 715/715 |
| 6,097,442 A | | 8/2000 | Rumreich et al. | |
| 6,414,698 B1 | * | 7/2002 | Lovell et al. | 715/800 |
| 6,452,597 B1 | * | 9/2002 | Goldberg | G09G 5/00 340/7.55 |
| 6,539,117 B2 | * | 3/2003 | Carau, Sr. | 382/229 |
| 6,845,485 B1 | | 1/2005 | Shastri et al. | |
| 6,912,013 B2 | * | 6/2005 | Katayama et al. | 348/564 |
| 7,165,264 B1 | * | 1/2007 | Westrick | 725/40 |
| 7,512,322 B2 | | 3/2009 | Seo et al. | |
| 7,627,176 B2 | * | 12/2009 | Takebe et al. | 382/180 |
| 7,817,856 B2 | * | 10/2010 | Yoshii et al. | 382/182 |
| 7,898,596 B2 | * | 3/2011 | Wang | 348/468 |

(Continued)

OTHER PUBLICATIONS

CEA 608-E-2008 (ANSI) Line 21 Data Services, [URL: http://webstore.ansi.org/RecordDetail.aspx?sku=CEA+608-E-2008+(ANSI)] on Aug. 20, 2012.

(Continued)

*Primary Examiner* — Brian Yenke
*Assistant Examiner* — Humam Satti
(74) *Attorney, Agent, or Firm* — Baker Hostetler LLP; Robert L. Hails

(57) ABSTRACT

Adjustments to the closed caption component of video content may be implemented by identifying text elements within the closed caption text component of a video stream and to properly adjust the appearance of the text elements. Embodiments described herein provide a method for detecting and correcting text elements that have spacing conflicts as a result of a size or other appearance adjustment. If the correction of a conflict results in a new conflict, such conflicts may be detected and one or more text elements grouped to form a new text element that may then be adjusted.

31 Claims, 7 Drawing Sheets

(56) References Cited

U.S. PATENT DOCUMENTS

| | | | | |
|---|---|---|---|---|
| 8,587,731 B2* | 11/2013 | Takahashi | | 348/745 |
| 2002/0075403 A1* | 6/2002 | Barone, Jr. | | H04N 5/44513 |
| | | | | 348/461 |
| 2002/0122136 A1* | 9/2002 | Safadi | | H04N 5/445 |
| | | | | 348/465 |
| 2003/0020834 A1* | 1/2003 | Gomikawa | | 348/589 |
| 2003/0145337 A1* | 7/2003 | Xing | | H04N 21/4888 |
| | | | | 725/136 |
| 2004/0135813 A1* | 7/2004 | Kanai | | 345/781 |
| 2004/0202352 A1* | 10/2004 | Jones | | G06F 17/211 |
| | | | | 382/114 |
| 2005/0225674 A1* | 10/2005 | Lynch | | 348/468 |
| 2007/0097262 A1* | 5/2007 | Kwon et al. | | 348/465 |
| 2007/0252913 A1* | 11/2007 | Minobe | | 348/465 |
| 2008/0189603 A1* | 8/2008 | Kikuchi | | 715/243 |
| 2008/0219636 A1* | 9/2008 | Green | | 386/52 |
| 2009/0027552 A1 | 1/2009 | Yang et al. | | |
| 2009/0322943 A1* | 12/2009 | Kasano | | 348/468 |
| 2010/0061705 A1* | 3/2010 | Seo et al. | | 386/95 |
| 2010/0188572 A1* | 7/2010 | Card, II | | 348/468 |
| 2010/0192178 A1* | 7/2010 | Candelore | | G06K 9/325 |
| | | | | 725/39 |
| 2010/0259676 A1* | 10/2010 | Swan | | 348/468 |
| 2011/0019088 A1* | 1/2011 | Kase | | 348/468 |
| 2011/0181773 A1* | 7/2011 | Ohashi | | H04N 21/431 |
| | | | | 348/465 |
| 2011/0285726 A1* | 11/2011 | Redmann | | 345/467 |
| 2012/0281139 A1* | 11/2012 | Zhang et al. | | 348/468 |
| 2012/0288190 A1* | 11/2012 | Tang | | G06K 9/00 |
| | | | | 382/165 |
| 2013/0179771 A1* | 7/2013 | Dent | | G06Q 10/107 |
| | | | | 715/234 |

OTHER PUBLICATIONS

CEA 708: Find Standards using keywords and publication number, [URL: http://webstore.ansi.org/FindStandards.aspx?SearchString=CEA+708&SearchOption=0&PageNum=0&SearchTermsArray=null%7cCEA+708%7cnull] on Aug. 20, 2012.

* cited by examiner

100

200

300

400

500

600

700

ENHANCED CLOSED CAPTION FEATURE

BACKGROUND

Aspects of the present invention relate generally to the field of video processing, and more specifically to display of a closed caption feature.

In conventional video coding systems, an encoder may code a source video sequence into a set of multiple data streams. For example, coded video may include a video stream, a text or closed caption stream, and an audio stream. Often, the source video is encoded with a plurality of different components. For example, the source video may be encoded with a low-resolution video component, with a high-resolution video component, with subtitles in one or more languages, or with one or more audio tracks.

The subtitle component of coded video data generally consists of coded images that are coded and displayed in accordance with Consumer Electronics Standard (CEA) 608 or CEA-708. CEA-608 and CEA-708 are standards that define methods for coding a text component with associated parameters to control the display of that text. CEA-608 compatible data is much more common than CEA-708 data and so the display of most coded video is limited to the parameters described therein. As set forth in CEA-608, the display area of a frame is divided into 32 columns and 15 rows, creating cells that each holds a single character such that each line may hold 32 characters. Then the size and placement of the text is limited to the height of each row and the width of each column. Then various characters may be placed on the screen based only on their associated cell coordinates. Therefore, data coded according to CEA-608 has limited display options for closed caption text.

Accordingly, there is a need in the art to process closed caption text to provide enhanced features that are otherwise not provided.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Video player device makers and video content distributors may be required to comply with regulations regarding the adjustment and display of closed caption for video content including allowing viewers to vary the size and type of text, thereby overriding the authored choices. However, data conforming to certain standards for closed captioning do not provide for such changes to the text provided by the content originators. Accordingly, systems and methods are provided herein to identify text elements within the text component of a video stream and to properly adjust the appearance of the text elements. Embodiments described herein provide a method for detecting and correcting text elements that have spacing conflicts as a result of a size or other appearance adjustment.

Figure 1:
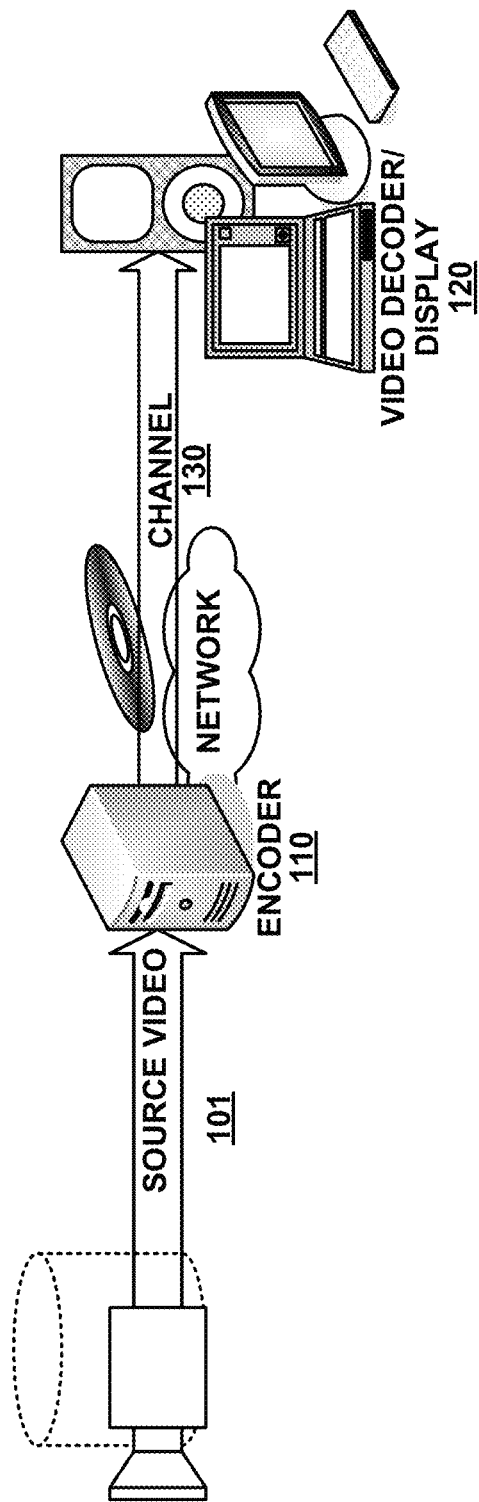
FIG. 1 is a simplified block diagram illustrating components of an exemplary video system according to an embodiment of the present invention.

FIG. 1 is a simplified block diagram illustrating components of an exemplary video system 100 according to an embodiment of the present invention. As shown in FIG. 1, an exemplary video system 100 may include an encoder system 110 and a decoder system 120 provided in communication via a channel 130. The encoder system 110 may accept a source video 101 and may code the source video 101 as coded video data, which may include a plurality of components. The encoder system 110 may process the input source video 101 as a series of frames and perform various operations on the frames including filtering operations such as de-noising filtering, bilateral filtering or other kinds of processing operations that improve efficiency of coding operations performed by the encoder system 110. Additionally, separate text, audio, and image components of the video data may be created.

The encoder system 110 may output the coded video data components to the channel 130, which may be a storage device, such as an optical, magnetic or electrical storage device, or a communication channel formed by a computer network or a communication network. According to an embodiment, the encoder system 110 may additionally output the complete original source video 101 to the channel 130. The decoder system 120 may receive the coded video data from the channel 130, process the coded video data components and output processed video data to an associated display device. The decoded video data may be an approximate reconstruction of the source video 101 that may include a plurality of the components, including for example, an image component, an audio component, and a text component. The decoder system 120 may process the video components to display the text component with enhanced closed caption features that may not have been originally available for displaying the text component or even considered during the creation f the component.

Figure 2:
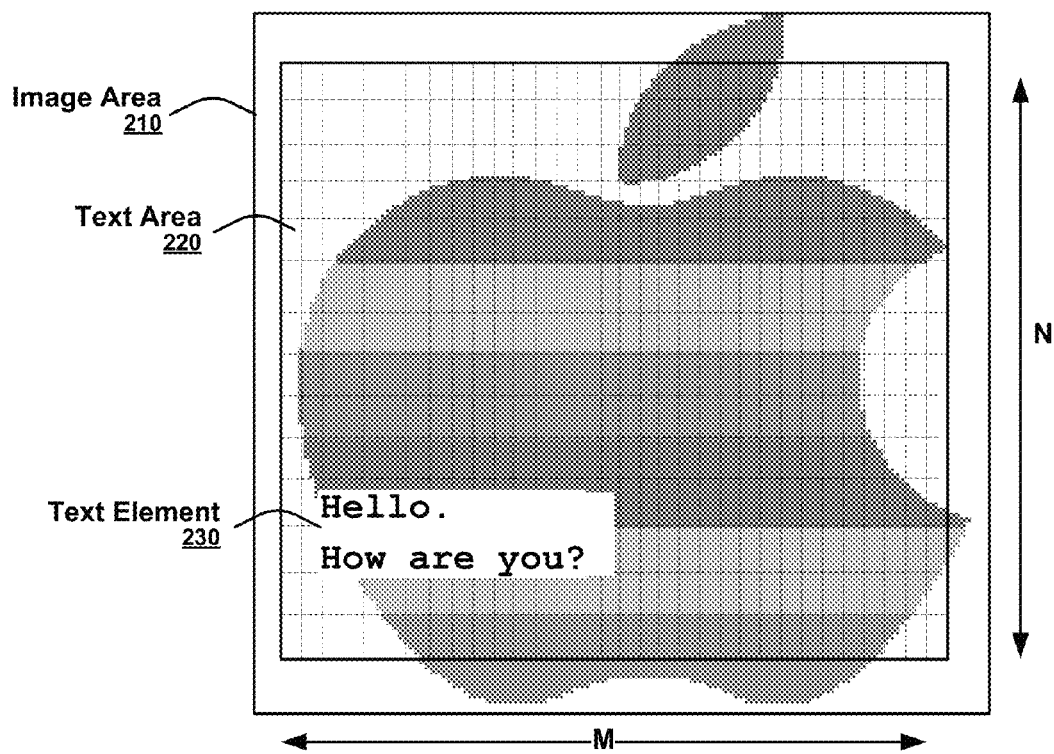
FIG. 2 illustrates an exemplary frame processed according to an embodiment of the present invention.

FIG. 2 illustrates an exemplary frame 200 processed according to an embodiment of the present invention. As previously noted, the video image data may be received at a decoder system as a sequence of image frames with an associated text component. As shown in FIG. 2, a frame 200 may include an image area 210 and a text area 220. The text area may be divided into N rows and M columns creating M×N cells to provide for appropriate placement of the characters of a text element 230. In an embodiment, the text area 220 may be smaller than the image area 220 of the frame to allow for proper viewing. In an embodiment, the text area 220 and the image area 230 may be the same area.

Upon creation of a text element by an encoder system, each character of the element may be given coordinates corresponding to a location in the text area 220 of the frame 200. Accordingly, the text component received by the decoder system may have a series of coordinates corresponding to the coordinates for each character. The decoder system may then identify a text element 230 having a plurality of characters wherein the text element contains only a single character or else each character in the text element is adjacent to at least one other character. Once a text element 230 is identified, the decoder system may scale, reposition, or otherwise adjust the size, placement, or appearance of the text element 230.

Figure 3:
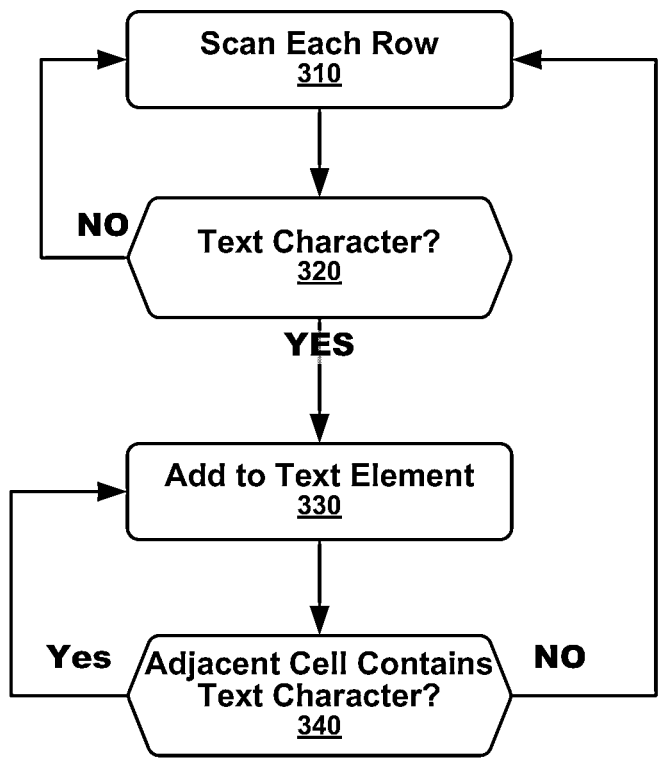
FIG. 3 is a simplified flow diagram illustrating an exemplary method for identifying text elements in a frame according to an embodiment of the present invention.

FIG. 3 is a simplified flow diagram illustrating an exemplary method 300 for identifying text elements in a frame according to an embodiment of the present invention. As shown in FIG. 3, to identify a text element in a frame, each row of the text component containing data for presentation of text characters in the frame may be scanned (block 310) to determine whether any character is to be displayed on the frame (block 320). According to an embodiment, each row may refer to one of 15 rows in which the text area of the frame may be divided. However, other rows may be utilized. Similarly, each column rather than each row may be scanned.

Once a text character is identified (block 320), the identified text character may be added to a new text element (block 330). Then once a text element is created, the cells adjacent to the characters in the text element may be analyzed to identify additional text characters (block 340). Identified adjacent text characters may then be added to the text element (block 330). In this manner, one or more text elements may be identified in a frame.

Once a text element is completed, the center of the text element may be defined. The center of the text element, or some other identified area of the text element, may serve as an anchor from which the text element may be repositioned or adjusted. Using such anchors may allow the text element layout to remain as consistent as possible with the original layout while implementing the indicated adjustments. Then if a text size increase expands a text character beyond the standard cell size, the characters of the text element may be repositioned with relation to the identified anchor. If the dimensions of the text element are additionally known, the size and placement of the text element may be identifiable.

Figure 4:
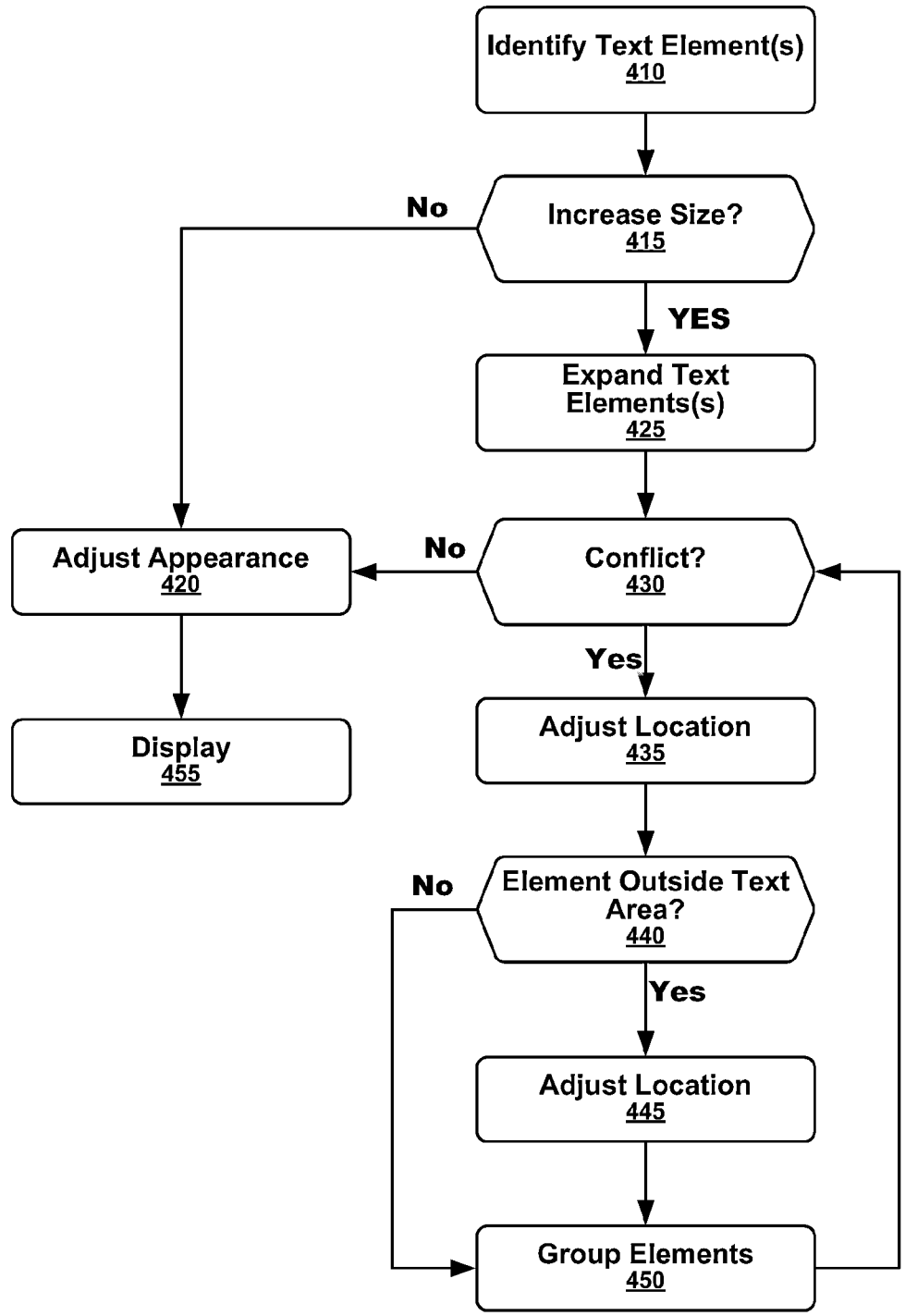
FIG. 4 is a simplified flow diagram illustrating an exemplary method for adjusting a text element according to an embodiment of the present invention.

FIG. 4 is a simplified flow diagram illustrating an exemplary method 400 for adjusting a text element according to an embodiment of the present invention. As shown in FIG. 4, once all the text elements of a frame are identified, each text element may be adjusted (block 410). If the adjustment does not include increasing the size of the text characters (block 415), other changes to the appearance may be implemented (block 420). For example, the text color, text font, or text element background color may be changed or the size of the text characters may be decreased. If the change includes switching fonts, and the new font is a proportionally spaced font, the cell coordinates identifying the location of each character may be disregarded and the individual width of each character considered. For left adjusted text elements, the location of each character may be determined with relation to the left most character of the row. Similarly, for right adjusted text elements, the location of each character may be determined with relation to the right most character of the row. Once all the indicated adjustments are implemented, the adjusted text component may be displayed with the video (block 455).

If the adjustment includes increasing the size of the text characters in the text element (block 415), such size adjustment may be made by expanding the text element (block 425). Once the indicated text elements are resized, each text element in the frame may be analyzed for conflicts (block 430). For example, if the expansion increased a text element beyond the borders of the text area of the frame, the text element may be repositioned to fit within the text area (block 435). However, if the characters in a row of the text element no longer fit within the width of the text element or of the text area for the frame, an appropriate line break may be added to the text element at an appropriate space. If there is no appropriate space, the size of the text element may be readjusted down to the largest size that will fit within the text area and/or text element.

Similarly, if the expansion of the text elements increased a text element such that it overlaps with another text element, the text elements may be positioned to correct the conflict (block 435).

Additional adjustments may be applied if a location adjustment creates a new conflict. If the new conflict is that the text element is in some part outside the border of the text area of the frame (block 440), the text element may be repositioned to fit within the text area (block 445). However, if a conflict is that two or more text elements overlap, a different adjustment is required. To properly adjust the text elements, two or more text elements that do not conflict may be grouped as a single new text element (block 450) and repositioned as if the group were a single text element. For example, if there are three text elements on a frame and the first and second text element are found to have a conflict, then one of the first or second elements may be adjusted to eliminate the conflict. If that adjustment results in a conflict with a third text element, the first and second elements may be grouped as a text element and treated as a single text element for the purpose of remedying the conflict with the third text element.

Once the appropriate adjustments are made, if the adjusted text fits within the text area of the frame and there are no further conflicts (block 430), and if no other adjustments are to be implemented (block 420), the text component and the frame may be prepared for display (block 455).

Figure 5:
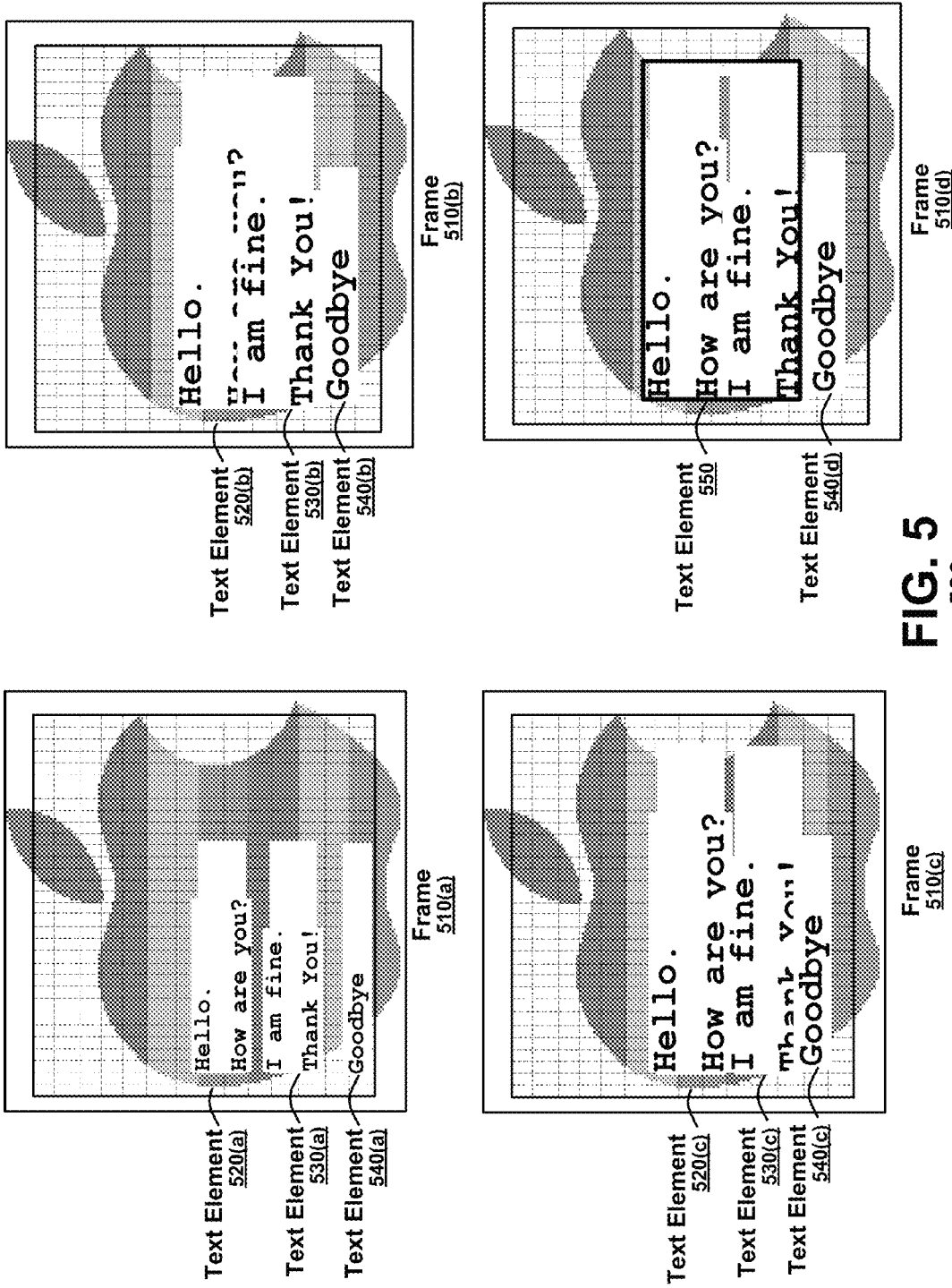
FIG. 5 illustrates exemplary processing of a frame according to an embodiment of the present invention.

FIG. 5 illustrates exemplary processing of a frame according to an embodiment of the present invention. As shown in FIG. 5, an exemplary frame 510(a) may include three different text elements 520, 530, 540. Then the expansion of the text elements may cause one or more text elements to overlap as shown in frame 510(b). To correct the conflict between text element 520(b) and text element 530(b), text element 530 may be relocated downwards as shown in frame 510(c). However, the shift of text element 530 may create a conflict between text element 530(c) and text element 540(c). As shown in frame 510(d), to correct for the conflict, a new text element, text element 550, may be created grouping text elements 530(c) and 540(c). Then the conflict between text element 550 and text element 540(d) may be resolved.

Figure 6:
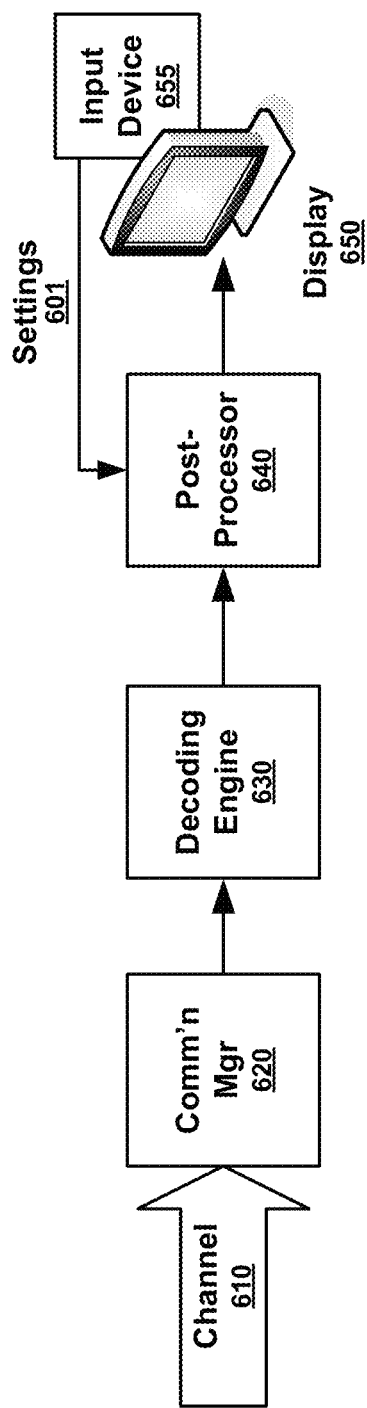
FIG. 6 is a simplified block diagram of a decoder system according to an embodiment of the present invention.

FIG. 6 is a simplified block diagram of a decoder system 600 according to an embodiment of the present invention. As shown in FIG. 6, a decoder system 600 may include a communication manager 620, a decoding engine 630 and a post-processor 640. The communication manager 620 may receive, store, and manage data received from the channel 610. As previously noted, the channel 610 may be a storage device or a communication channel formed by a network. The decoding engine 630 may parse the received coded data as needed to recover the original source video data, for example by inverting any coding operations performed by an encoder system. The post processor 640 may process the video data to prepare it for display. Such processing may include filtering, de-interlacing, scaling, adjusting the appearance of a text component, adjusting the playback appearance or timing of multiple video components, or otherwise performing other processing operations on the video data that may improve the quality of the video displayed. The processed video data may be displayed on a screen or other display 650 or may be stored in a storage device for later use.

The decoder system 600 may further include an input device 655 to receive setting adjustments 601. For example, a user of the decoder system 600 may request an adjustment to the appearance, location, or size of a text component of the video data. The changes to the text component according to the received settings 601 may be implemented by the post processor 640 or other element of the decoder system 600 as described above. In an embodiment, text component settings 601 may be set by default or may be adjusted automatically to compensate for a change in decoder system resources. An adjustment setting may be applied to the entire video or a portion of the video data, for example, a single frame or a sequence of frames.

Figure 7:
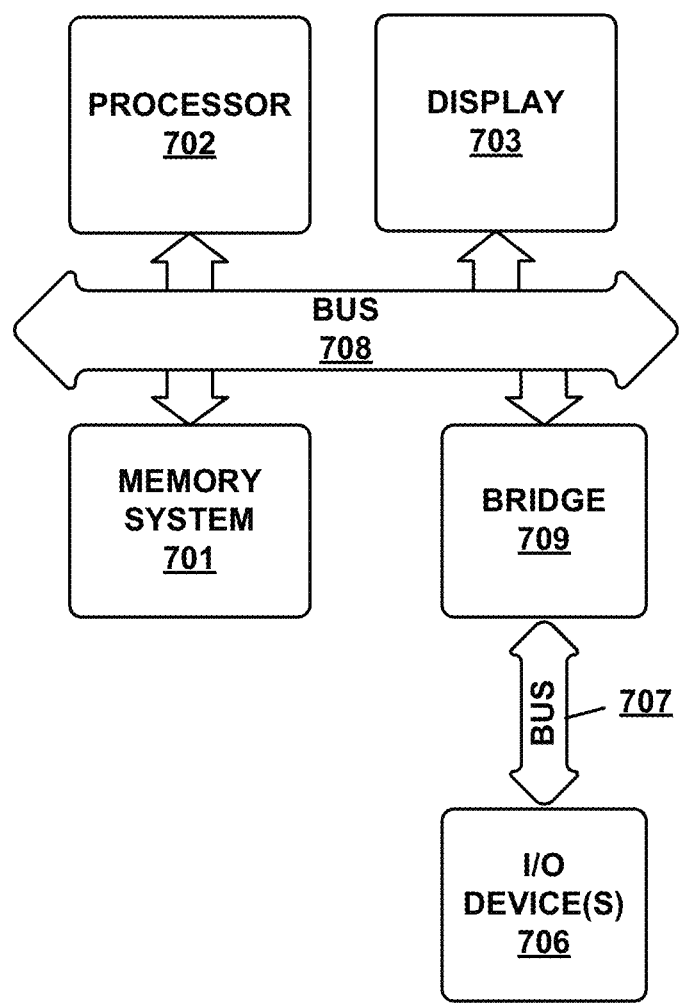
FIG. 7 is a simplified block diagram illustrating components of a decoder system according to an embodiment of the present invention.

FIG. 7 is a simple block diagram illustrating components of a decoder system 700 according to an embodiment of the present invention. As shown in FIG. 7, the decoder system 700 may be configured to process and adjust the display of a text component of a video stream as described herein may include a processor 702, a memory system 701, a display 703 and one or more input/output (I/O) devices 706 in communication. The communication can be implemented in a variety of ways and may include one or more computer buses 707, 708 and/or bridge devices 709 as shown in FIG. 7. The I/O devices 706 can include network adapters and/or mass storage devices from which the decoder system 700 can receive commands for executing the text component processing as described above. According to an embodiment, a decoder system 700 may be a stand-alone system, such as a single handheld device, television system, or computing system or may be part of a networked environment.

As discussed above, FIGS. 1 and 6 illustrate functional block diagrams of video coding systems. In implementation, the systems may be embodied as hardware systems, in which case, the blocks illustrated in FIGS. 1 and 6 may correspond to circuit sub-systems within the systems. Alternatively, the encoders may be embodied as software systems, in which case, the blocks illustrated may correspond to program modules within software programs. In yet another embodiment, the systems may be hybrid systems involving both hardware circuit systems and software programs. For example, the decoding engine 630 may be provided as an integrated circuit while the post-processor 640 may be provided as one or more software modules. Other implementations also may be used. Moreover, not all of the functional blocks described herein need be provided or need be provided as separate units. For example, although FIG. 6 illustrates the components of an exemplary decoding system such as the communication manager 620 and the decoding engine 630 as separate units, in one or more embodiments they may be integrated. Such implementation details are immaterial to the operation of the present invention unless otherwise noted above.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method for displaying a text component received in a channel with video data, comprising:
    in response to a user request to adjust an appearance of the text component displayed in a first text area of video data and having predefined row and column barriers between individual adjacent text characters, creating a new text element that does not have predefined row and column barriers between individual adjacent text characters,
    starting with a first text character from the text component, extracting a continuous text string that includes the first text character to the new text element; and
    displaying the new text element in a portion of a display area assigned to the first text area formatted according to the user request.

2. The method of claim 1, wherein the displaying changes a size of the text characters in the text new element as compared to their representation in the text component.

3. The method of claim 1, wherein the displaying repositions the text characters in the new text area as compared to their representation in the text component.

4. The method of claim 1, wherein the displaying adds a line break to the text characters in the new text element as compared to their representation in the text component.

5. The method of claim 1, wherein the displaying changes a font of the text characters in the new text element as compared to their representation in the text component.

6. The method of claim 1, further comprising identifying a center of the new text element and using the center as an anchor to display the text new element.

7. The method of claim 1, further comprising:
    if a display conflict occurs between the new text element and other content of the text area, adjusting an appearance of the new text element from a default appearance.

8. The method of claim 7, wherein said display conflict occurs when at least a portion of the text element is outside the text area.

9. The method of claim 7, wherein said display conflict occurs when the text element overlaps with a portion of a second text element.

10. The method of claim 7, wherein said adjusting comprises decreasing the size of the text characters in the text element.

11. The method of claim 7, further comprising,
    if when said adjusting creates a second display conflict:
    grouping two or more text elements into a common text element, and
    the displaying comprises displaying the common text element.

12. The method of claim 1, wherein said extracting comprises scanning each row of the text area.

13. The method of claim 1, wherein said extracting comprises analyzing each cell adjacent to each text character added to the text element.

14. The method of claim 1, wherein said text area comprises 15 rows and 32 cells per row.

15. A method for evaluating an adjustment to a text component received in a channel with video data, comprising:
- in response to a user request to adjust an appearance of the text component displayed in a first text area of video data and having predefined row and column barriers between individual adjacent text characters, creating a new text element that does not have predefined row and column barriers between individual adjacent text characters,
- starting with a first text character from the text component, extracting a continuous text string that includes the first text character to the new text element, and
- displaying the new text element in a portion of a display area assigned to the first text area formatted according to the user request.

16. The method of claim 15, further comprising:
- if a display conflict occurs between the text element and a second text element:
  - grouping two or more text elements into a common text element, and
  - adjusting the appearance of the common text element.

17. The method of claim 15, further comprising changing a size of the text characters in the text element.

18. The method of claim 15, further comprising positioning repositioning the text characters on the text area.

19. A system comprising:
- a processor configured to:
  - in response to a user request to adjust an appearance of a text component displayed in a first text area of video data and having predefined row and column barriers between individual adjacent text characters, create a new text element that does not have predefined row and column barriers between individual adjacent text characters,
  - starting with a first text character from the text component, extract a continuous text string that includes the first text character to the new text element,
  - display the new text element in a portion of a display area assigned to the first text area formatted according to the user request.

20. The system of claim 19, wherein the processor is further configured to change a size of the text characters in the text element.

21. The system of claim 19, wherein the processor is further configured to reposition the text characters on the text area.

22. The system of claim 19, wherein said processor is further configured to adjust the appearance of the text element if the display of the text element creates a conflict wherein the text element cannot be properly displayed on the text area.

23. The system of claim 22, wherein if said adjusting creates a second conflict, said processing device is further configured to:
- group two or more text elements into a common text element, and
- adjust the appearance of the common text element.

24. The system of claim 19, further comprising an input device for receiving the request as an input setting for displaying the text component.

25. A non-transitory computer readable medium storing program instructions that, when executed by a processing device, cause the device to:
- in response to a user request to adjust an appearance of a text component displayed in a first text area of video data having predefined row and column barriers between individual adjacent text characters, create a new text element that does not have predefined row and column barriers between individual adjacent text characters,
- starting with a first text character from the text component, extract a continuous text string that includes the first text character to the new text element,
- display the new text element in a portion of a display area assigned to the first text area formatted according to the user request.

26. The computer readable medium of claim 25, wherein the processing device is further configured to change a size of the text characters in the new text element as compared to their representation in the text component.

27. The computer readable medium of claim 25, wherein said processing device is further configured to reposition the text characters in the new text area as compared to their representation in the text component.

28. The computer readable medium of claim 25, wherein said processing device is further configured to adjust the appearance of the text element if the display of the text element creates a conflict wherein the text element cannot be properly displayed on the text area.

29. The computer readable medium of claim 28, wherein if said adjusting creates a second conflict, said processing device is further configured to:
- group two or more text elements into a common text element, and
- adjust the appearance of the common text element.

30. The method of claim 1, further comprising:
- repeating the creating and extracting for a second new text element;
- prior to the displaying:
  - determining whether a displayed location of the first new text element with the adjusted appearance applied will conflict with a displayed location of the second new text element with the adjusted appearance applied; and
  - if a conflict will occur, grouping the second new text element and the first new text element.

31. The method of claim 15, further comprising:
- repeating the creating and extracting for a second new text element;
- prior to the displaying:
  - determining whether a displayed location of the first new text element with the adjusted appearance applied will conflict with a displayed location of the second new text element with the adjusted appearance applied; and
  - if a conflict will occur, grouping the second new text element and the first new text element.

* * * * *